(12) United States Patent
Wesson et al.

(10) Patent No.: US 9,115,466 B2
(45) Date of Patent: Aug. 25, 2015

(54) METHOD OF MAKING A WOVEN FABRIC HAVING A DESIRED SPACING BETWEEN TENSION MEMBERS

(75) Inventors: John P. Wesson, Vernon, CT (US); Gopal R. Krishnan, Wethersfield, CT (US)

(73) Assignee: Otis Elevator Company, Farmington, CT (US)

( * ) Notice: Subject to any disclaimer, the term of this patent is extended or adjusted under 35 U.S.C. 154(b) by 241 days.

(21) Appl. No.: 13/641,877

(22) PCT Filed: May 13, 2010

(86) PCT No.: PCT/US2010/034641
§ 371 (c)(1),
(2), (4) Date: Oct. 18, 2012

(87) PCT Pub. No.: WO2011/142756
PCT Pub. Date: Nov. 17, 2011

(65) Prior Publication Data
US 2013/0042939 A1 Feb. 21, 2013

(51) Int. Cl.
*B66B 7/06* (2006.01)
*D03D 15/00* (2006.01)
*D07B 1/22* (2006.01)
*D03D 1/00* (2006.01)
*D03D 15/02* (2006.01)
*D03D 15/04* (2006.01)
*D03J 1/06* (2006.01)
*D07B 5/04* (2006.01)
*B29C 61/02* (2006.01)

(52) U.S. Cl.
CPC . *D07B 1/22* (2013.01); *B66B 7/062* (2013.01); *D03D 1/0094* (2013.01); *D03D 15/0094* (2013.01); *D03D 15/02* (2013.01); *D03D 15/04* (2013.01); *D03J 1/06* (2013.01); *D07B 5/04* (2013.01); *B29C 61/02* (2013.01); *D07B 2201/1092* (2013.01); *D07B 2501/2007* (2013.01); *D10B 2101/20* (2013.01); *D10B 2401/04* (2013.01)

(58) Field of Classification Search
None
See application file for complete search history.

(56) References Cited

U.S. PATENT DOCUMENTS

| 1,475,250 | A | * | 11/1923 | Sundh | 254/266 |
|---|---|---|---|---|---|
| 1,477,886 | A | | 12/1923 | Lewis | |
| 2,088,448 | A | | 7/1937 | Specht | |
| 2,332,393 | A | | 10/1943 | Neville | |
| 3,148,710 | A | | 9/1964 | Rieger et al. | |
| 3,297,513 | A | | 1/1967 | Robinson | |
| 3,473,576 | A | | 10/1969 | Amneus | |
| 3,885,603 | A | | 5/1975 | Slaughter | |
| 3,973,670 | A | | 8/1976 | Spaar | |
| 4,109,543 | A | | 8/1978 | Foti | |
| 4,305,433 | A | | 12/1981 | Vanassche et al. | |
| 4,407,885 | A | | 10/1983 | Murphy et al. | |
| 4,820,571 | A | | 4/1989 | Searfass | |
| 4,870,998 | A | | 10/1989 | Westhead | |
| 4,887,656 | A | | 12/1989 | Verbauwhede et al. | |
| 4,945,952 | A | * | 8/1990 | Vohringer | 139/383 A |
| 5,196,092 | A | | 3/1993 | Stigberg | |
| 5,292,578 | A | | 3/1994 | Kolzer | |
| 5,454,403 | A | | 10/1995 | Kerr et al. | |
| 5,609,242 | A | | 3/1997 | Hutchins et al. | |
| 6,736,714 | B2 | | 5/2004 | Dudovicz | |
| 6,866,068 | B2 | | 3/2005 | Berger et al. | |
| 6,905,574 | B2 | | 6/2005 | Festor | |
| 7,217,210 | B2 | | 5/2007 | Wood | |
| 7,287,553 | B2 | | 10/2007 | Wahhoud | |
| 8,210,320 | B2 | | 7/2012 | Ach | |
| 2003/0036325 | A1 | * | 2/2003 | Schneider et al. | 442/208 |
| 2007/0235595 | A1 | | 10/2007 | Braekevelt et al. | |
| 2008/0067007 | A1 | | 3/2008 | Ach | |
| 2011/0259677 | A1 | * | 10/2011 | Dudde et al. | 187/411 |

FOREIGN PATENT DOCUMENTS

| CN | 1664202 | 9/2005 |
|---|---|---|
| CN | 101349023 A | 1/2009 |
| DE | 10100484 A1 | 7/2002 |
| GB | 1559380 | 8/1976 |
| GB | 1583853 | 5/1978 |
| JP | 5178434 A | 7/1993 |
| JP | H10168701 A | 6/1998 |
| JP | 2002201547 A | 7/2002 |
| KR | 100881930 | 1/2009 |
| KR | 10-0881930 B1 * | 2/2009 |
| KR | 20090057725 A | 6/2009 |
| KR | 10-0910981 B1 * | 8/2009 |
| KR | 100910981 | 8/2009 |
| WO | 99/43589 | 9/1999 |
| WO | 0114630 A1 | 3/2001 |
| WO | 2005007988 A2 | 1/2005 |

OTHER PUBLICATIONS

International Preliminary Report on Patentability for Application No. PCT/US2010/034641 dated Nov. 22, 2012.
International Search Report and Written Opinion of the International Searching Authority for International application No. PCT/US2010/034641 dated Feb. 1, 2011.
Extended European Search Report for Application No. EP 10 85 1528 dated Feb. 26, 2014.
Extended European Search Report for Application No. EP 10 85 1509 dated Feb. 24, 2014.
Chinese Search Report for Application No. 201080066738.8 dated Jun. 7, 2013.

* cited by examiner

*Primary Examiner* — William Phillip Fletcher, III
(74) *Attorney, Agent, or Firm* — Carlson, Gaskey & Olds

(57) ABSTRACT

An exemplary method of making a woven fabric includes weaving a plurality of load supporting tension members and a plurality of cross fibers together into a woven fabric. A spacing between adjacent ones of the tension members has a first dimension. At least some of the cross fibers are shrunk to thereby decrease the spacing between the adjacent ones of the tension members to a second, smaller dimension. In another example, two woven fabrics are positioned next to each other. The two fabrics include a spacing between adjacent tension members having a first dimension. At least one tension member of one woven fabric is aligned with and between two of the tension members of the other fabric to thereby decrease the spacing to a second, smaller dimension.

21 Claims, 4 Drawing Sheets

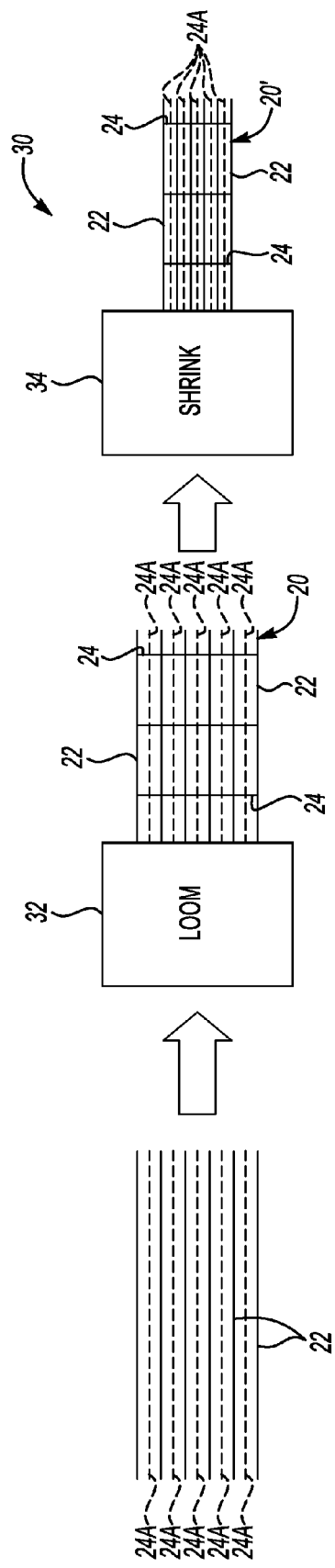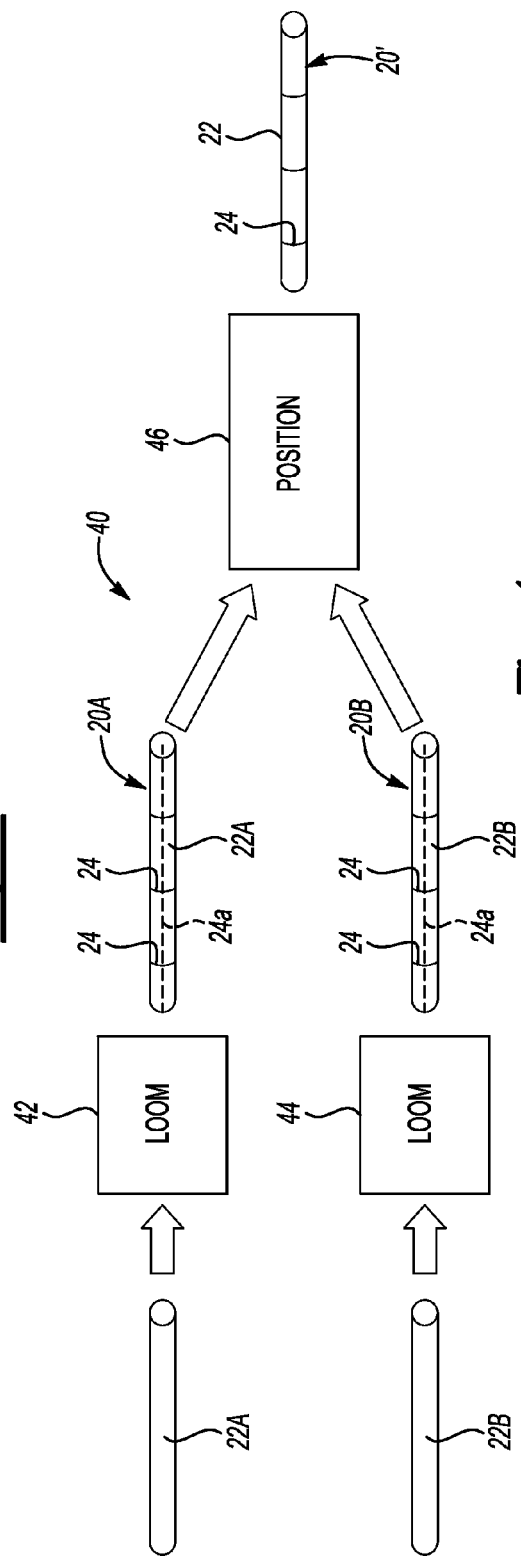

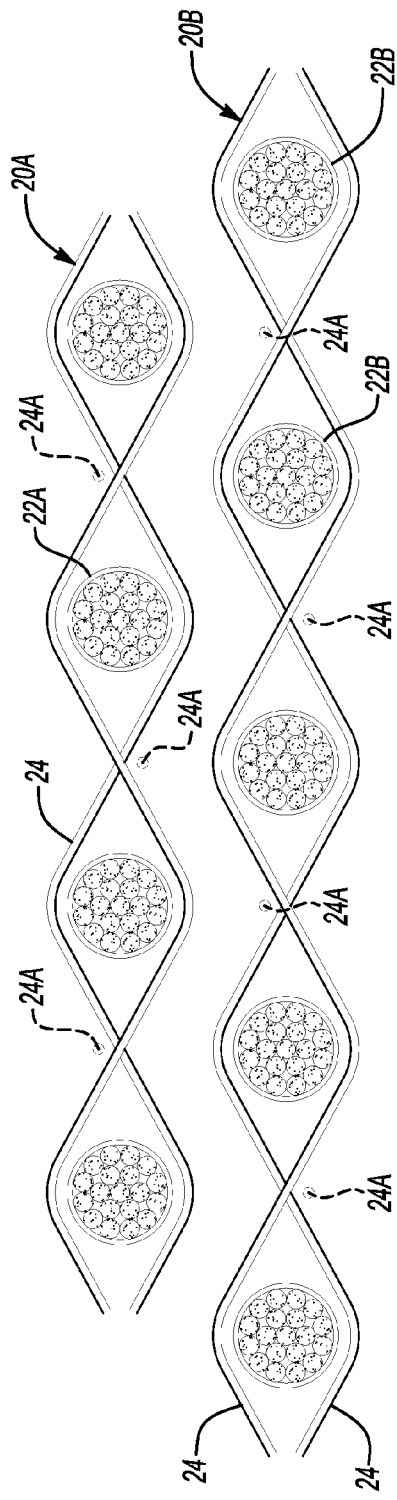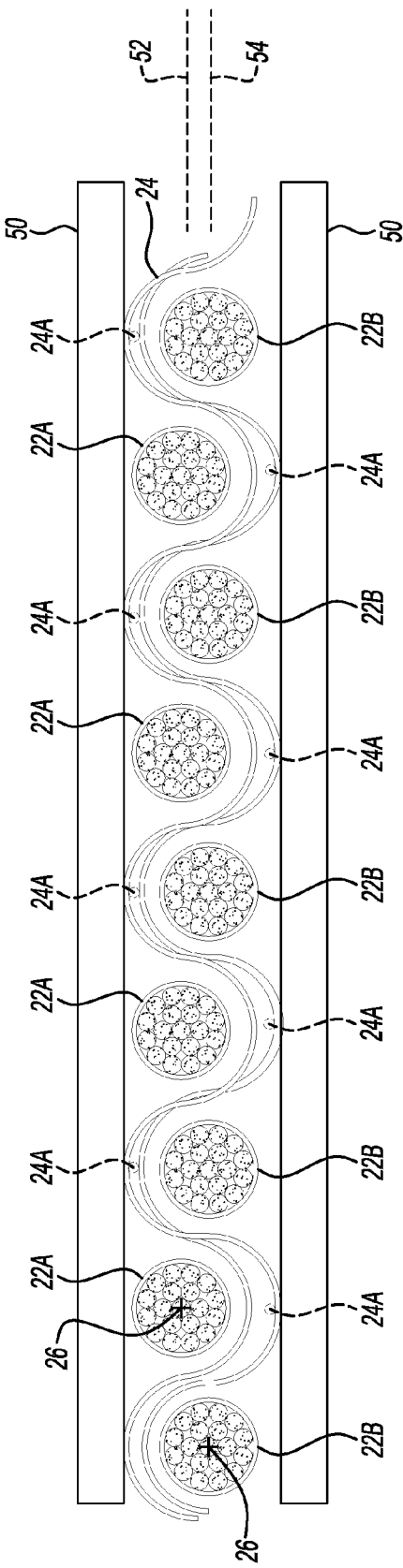

METHOD OF MAKING A WOVEN FABRIC HAVING A DESIRED SPACING BETWEEN TENSION MEMBERS

BACKGROUND

There are a variety of uses of elongated load carrying members such as round ropes or flat belts. One such use is to suspend the loads in elevator systems and known load carrying members are used for propulsion in elevator systems. Traditional, round steel ropes have more recently been replaced in some systems with flat belts including a plurality of tension member cords encased in a jacket. While there are advantages associated with such belts in an elevator system, there are also challenges presented. For example, typical manufacturing approaches can leave grooves on an exterior surface of the belt. As the grooves interact with the sheaves in an elevator system, there can be resulting noise, which is undesirable. Manufacturing techniques that eliminate such grooves are desirable. Additionally, it would be useful to reduce costs associated with making such belts.

SUMMARY

An exemplary method of making a woven fabric includes weaving a plurality of load supporting tension members and a plurality of cross fibers together into a woven fabric. A spacing between immediately adjacent ones of the tension members has a first dimension. Shrinking at least some of the cross fibers decreases the spacing between the immediately adjacent ones of the tension members to a second, smaller dimension.

Another exemplary method of making a woven fabric includes weaving a plurality of first tension members and a plurality of cross fibers together into a first woven fabric. A spacing between immediately adjacent ones of the first tension members has a first dimension. A plurality of second tension members and a second plurality of cross fibers are woven together into a second woven fabric. Spacing between immediately adjacent ones of the second tension members has the first dimension. The first woven fabric is positioned adjacent the second woven fabric with at least one of the second tension members aligned with and between two of the first tension members to thereby decrease the spacing between immediately adjacent ones of the tension members to a second, smaller dimension.

One example use of a woven fabric designed according to an embodiment of this invention is a load bearing member for use in an elevator system. One such example comprises a flat belt.

The various features and advantages of the disclosed examples will become apparent to those skilled in the art from the following detailed description. The drawings that accompany the detailed description can be briefly described as follows.

BRIEF DESCRIPTION OF THE DRAWINGS

FIG. 3 schematically illustrates one example method of making a woven fabric designed according to an embodiment of this invention.

FIG. 4 schematically illustrates another example method of making a woven fabric designed according to an embodiment of this invention.

FIG. 5 schematically illustrates a portion of the method schematically shown in FIG. 4.

FIG. 6 schematically illustrates another portion of the method schematically shown in FIG. 4.

DETAILED DESCRIPTION

Figure 1:
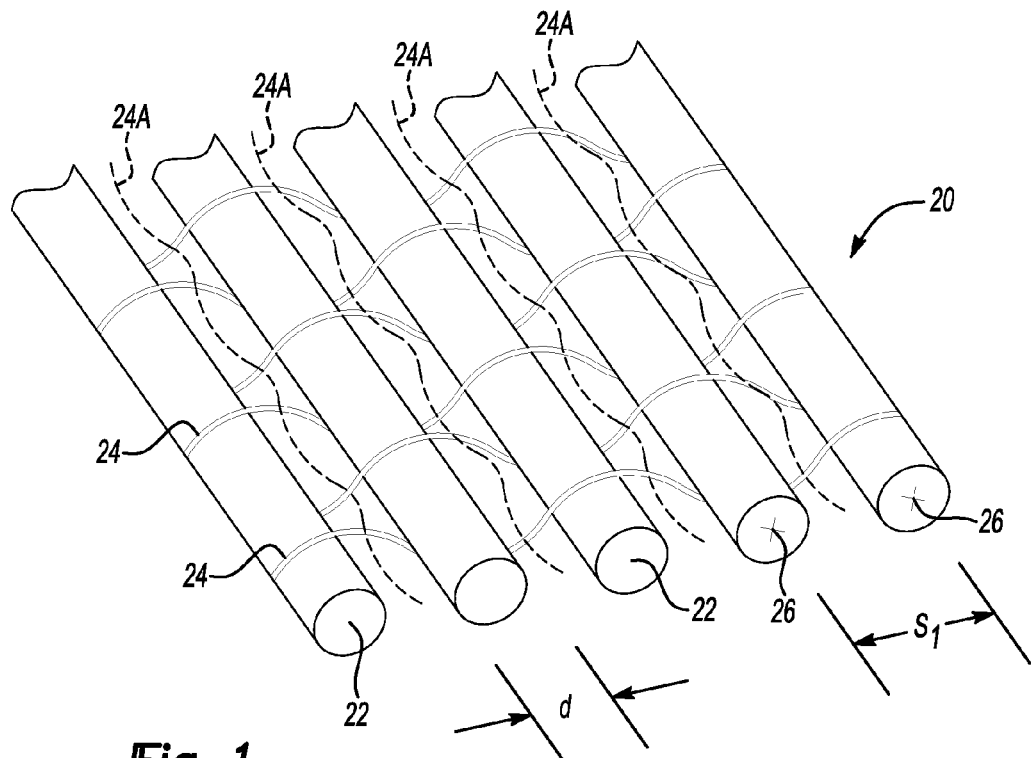
FIG. 1 schematically shows selected portions of an example woven fabric with a first spacing between tension members of the fabric.

FIG. 1 schematically shows selected portions of a woven fabric 20. A plurality of tension members 22 can extend in a longitudinal direction and can be aligned generally parallel with each other. Only a portion of the length of the tension members 22 (i.e., in the longitudinal direction) is shown in the drawings. The tension members 22 extend along the length of the woven fabric 20 such that the length is much greater than the width of the fabric in some examples. In one example the tension members 22 comprise steel cords, which comprise a single strand or a plurality of strands wound together into cords. The strands each comprise a plurality of individual wires that are wound together into the strands. Other materials for the tension members 22 may be used depending on the needs of a particular situation. In many examples, the tension members 22 are configured to support a load in a lengthwise direction. The tension members 22 are the primary load supporting elements of a load bearing assembly, such as an elevator belt, that includes the woven fabric 20.

A plurality of cross fibers 24 are woven together with the tension members 22 to establish the woven fabric 20. As shown in phantom in FIG. 1, the woven fabric 20 could include one or more fibers 24a that extend generally parallel with the tension members 22. The fibers 24, 24a comprise a different material than the material of the tension members 22 in one example. In another example, at least the fibers 24a comprise the same material as used for the tension members 22. In addition, the cross fibers 24 can be the same material as fibers 24a or a different material. The selection of the material for the cross fibers 24 will depend on the intended use of the woven fabric and may depend on the method of making the woven fabric as will be appreciated by considering example methods described below.

One feature of the woven fabric 20 is that the size and stiffness of the tension members 22 places limitations on how closely the tension members 22 can be positioned relative to each other during the weaving process. As shown in FIG. 1, each of the tension members 22 has a diameter d. A spacing between centerlines 26 of immediately adjacent ones of the tension members 22 has a first dimension $s_1$. Given the limitations of weaving machines or looms, the dimension $s_1$ of the first spacing is greater than the diameter d of the tension members 22. In one example, the dimension $s_1$ is approximately two times the diameter d.

The spacing discussed above is between immediately adjacent tension members 22, which do not have any intervening tension members between them. Of course, the spacing between any one of the tension members 22 and any other one is also reduced.

Conventional weaving techniques limit how closely the tension members 22 can be positioned relative to each other.

The comb or reed of a loom, for example, must have sufficient strength and thickness to guide the tension members 22 in the loom.

Figure 2:
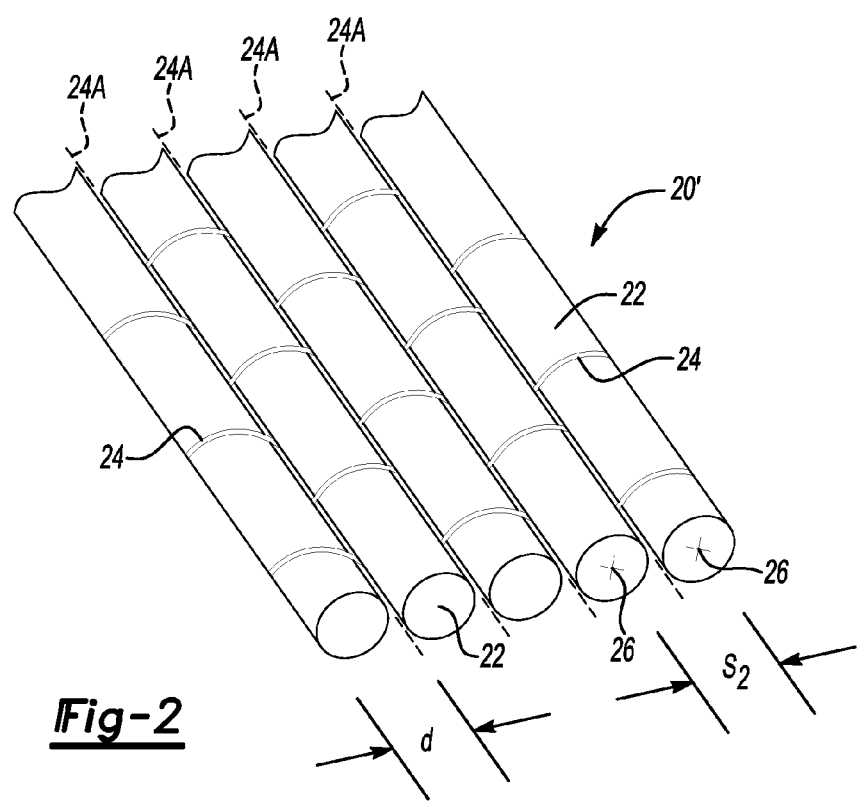
FIG. 2 schematically shows the example of FIG. 1 with a second, smaller spacing between the tension members.

FIG. 2 shows the woven fabric 20' after subsequent processing that brings the tension members 22 closer together. As can be appreciated from the illustration, a second dimension $s_2$ of the space between centerlines 26 of immediately adjacent ones of the tension members 22 is smaller than the dimension $s_1$ of the spacing in FIG. 1. In one example, the dimension $s_2$ of the spacing is within a range between the dimension of the diameter d and 1.75×d. In one example, the second dimension $s_2$ is between 1.4×d and 1.6×d. In another example, the second dimension $s_2$ is approximately 1.1×d.

Achieving a smaller spacing between adjacent ones of the tension members 22 allows for the woven fabric 20' to be used in a wider variety of applications compared to the woven fabric 20 that includes a larger spacing between adjacent tension members. More cords within a defined width provides a stronger and stiffer fabric.

For example, flat belts in elevator systems require relatively close spacing between tension members, which are the primary load supporting elements, to achieve sufficient load distribution and support. The spacing between the tension members 22 in the example of FIG. 1 may make the woven fabric 20 of FIG. 1 a less than optimum choice as (or part of) an elevator system load bearing member for many system configurations. On the other hand, the spacing between adjacent tension members 22 in the woven fabric 20' may render the fabric 20' more optimal as a load bearing member (or a part of one) for supporting the weight of an elevator car and counterweight, for example. The smaller spacing between the primary load supporting elements of an elevator load bearing assembly is better for most situations. Accordingly, less space between the tension members 22 is generally desired.

FIG. 3 schematically illustrates one example method of making the example woven fabric 20'. A plurality of tension members 22 are provided to a loom 32 in which the tension members 22 are woven together with cross fibers 24 resulting in the woven fabric 20 as schematically shown. In this example, the material of the cross fibers 24 is shrinkable. The example of FIG. 3 includes a shrinking device 34 that causes the cross fibers 24 to shrink. One example includes a material that shrinks as a result of being heated and the shrinking device includes appropriate heating elements. One example shrinking device 34 comprises a forced air oven. Example shrinkable fibers include crosslink polyolefins, spun fibers, heat-shrinkable tubing materials and Mylar fibers.

As the fibers 24 shrink, they draw the tension members 22 closer together to thereby reduce the spacing between immediately adjacent ones of the tension members 22. As a result of the shrinking of the cross fibers 24, a smaller spacing $s_2$ between the tension members 22 can be achieved that was not possible within the loom 32. The example of FIG. 3 shows one way in which spacing between the tension members is decreased from a first dimension such as $s_1$ to a second, smaller dimension such as $s_2$.

FIG. 4 schematically illustrates another example method of making a woven fabric having a desired spacing between tension members even when that desired spacing is not achievable with a loom. In this example, a first plurality of tension members 22A are provided to a loom 42 where they are woven together with cross fibers 24 to establish a first woven fabric 20A. A second plurality of tension members 22B are provided to a second loom 44 where they are woven together with cross fibers 24 to establish a second woven fabric 20B.

The tension members in the two woven fabrics 20A and 20B have a spacing between immediately adjacent ones of the tension members that has a first dimension such as $s_1$. The woven fabrics 20A and 20B are both provided to a positioning device 46 that positions the woven fabrics relative to each other such that at least one of the second tension members 22B is aligned with and between two of the first tension members 22A. This positioning of the tension members from the two woven fabrics 20A and 20B results in an assembly having a decreased spacing between immediately adjacent tension members. In this example, the two woven fabrics 20A and 20B effectively combine to establish a single woven fabric 20' having a desired spacing between immediately adjacent ones of the tension members 22. In one example, the spacing has the second, smaller dimension $s_2$.

FIG. 5 schematically shows the woven fabrics 20A and 20B as they approach the positioning device 46. FIG. 6 schematically shows the positioning operation. In this example, the two woven fabrics are forced between rollers 50 that urge the tension members 22A and 22B into alignment with each other. At the stage of the example process schematically shown in FIG. 6, the centerlines 26 of the tension members 22A are aligned with each other and in a plane shown at 52. The centerlines 26 of the tension members 22B are aligned with each other and in a plane 54. In some examples, there may be some distance between the planes 52 and 54. In other examples, the positioning device 46 urges the two woven fabrics 20A and 20B together in such a way that the planes 52 and 54 are coincident and the centerline 26 of every tension member is within a single plane. This type of arrangement is shown, for example, in FIG. 7. The example of FIG. 7 includes the centerlines 26 of every tension member 22 aligned within a single plane 56.

During the positioning of the two fabrics together, the cross fibers 24 of one example will stretch to accommodate movement of the tension members into the positions where they are aligned with and between each other. One such example includes elastic cross fibers 24. As can be appreciated from FIGS. 5 and 6, in the illustrated example each of the tension members 22A of the woven fabric 20A are received into the spacing between the tension members 22B of the woven fabric 20B. The result is a decreased spacing between immediately adjacent ones of the tension members in the final assembly. This renders the woven fabric assembly useful for a variety of purposes in which relatively close spacing between tension members is desired such as within an elevator system.

In some examples, the cross fibers 24 have a characteristic that facilitates joining the woven fabrics 20A and 20B into a single assembly 20'. In one example, the cross fibers 24 will at least partially melt when heated and then stick to each other upon cooling. Another example includes an adhesive coating on the cross fibers that holds the woven fabrics 20A and 20B together.

Other examples include applying an adhesive or a coating to the assembly to hold the woven fabric assembly 20' together with the desired spacing between the tension members 22.

Figure 7:
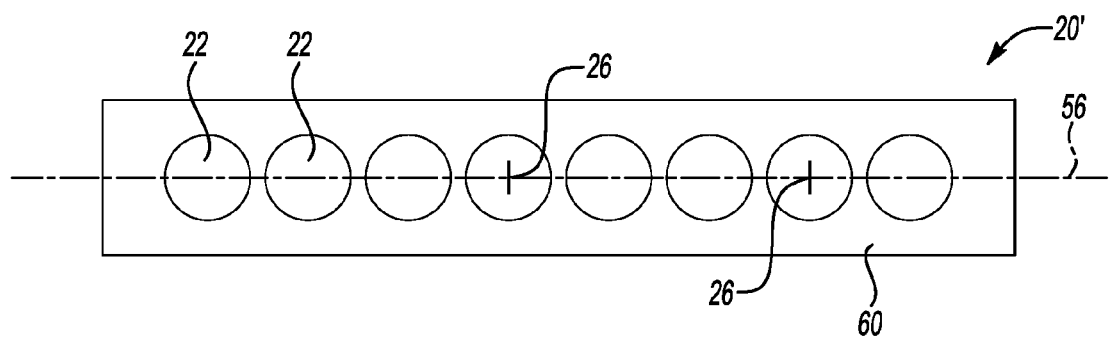
FIG. 7 schematically shows an example flat belt arrangement.

The example of FIG. 7 illustrates one way in which a woven fabric designed according to an embodiment of this invention can be incorporated into a flat belt, load bearing member. The example of FIG. 7 includes a jacket 60 that is applied to the woven fabric 20' to at least partially encase the tension members 22. In this example, the tension members 22 are completely encased in the jacket material of the jacket 60. The jacket could be applied to the woven fabric 20' using a variety of methods including impregnation of the woven fabric 20, 20' with an elastomeric material.

One feature of the example of FIG. 7 is that when the example method of FIG. 4 is used for making the woven fabric 20', the jacket material 60 secures the tension members of the two initial woven fabrics into desired alignment with each other. In one example, the cross fibers 24 are made from a material that will melt at a temperature of the jacket material as the jacket 60 is applied to the woven fabric assembly. Such examples allow for controlling the final position and alignment of the tension members 22 within the final product without having to overcome resistance that might otherwise be present because of the cross fibers 24.

The example of FIG. 7 can alternatively incorporate the woven fabric 20' made using the example technique of FIG. 3.

The tension members 22 shown in the illustrations have cords arranged in a known "1+6+12" construction. The tension members 22 need not have that particular configuration. Any practical construction with the required size and strength could be used. Those skilled in the art who have the benefit of this description will realize a construction that will meet their particular needs.

Figure 8:
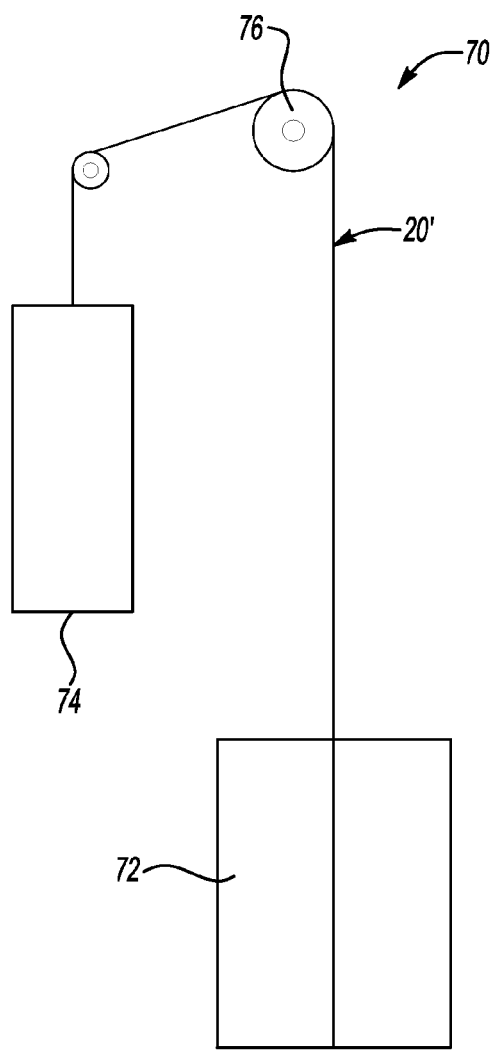
FIG. 8 schematically shows selected portions of an elevator system in which an example embodiment of a woven fabric is useful.

FIG. 8 schematically shows selected portions of an example elevator system 70 in which the woven fabric 20' is useful as a load carrying member for suspending and/or driving an elevator car 72 and/or counterweight 74. In this example, a jacket 60 (as shown in FIG. 7) is provided on the woven fabric 20'. The jacket includes at least one traction surface that is configured to cooperate with a traction sheave 76 to achieve desired motion within the elevator system 70.

Elevator load bearing members are one example use for a woven fabric made according to an embodiment of this invention. The example woven fabrics and methods of making them may be useful for other applications, also.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a woven fabric, comprising the steps of:
weaving a plurality of load supporting tension members and a plurality of cross fibers together into a woven fabric having a spacing between adjacent ones of the tension members, the spacing having a first dimension; and
shrinking at least some of the cross fibers to thereby decrease the spacing between the adjacent ones of the tension members to a second, smaller dimension;
wherein the load supporting tension members are the primary load supporting elements of an elevator load bearing assembly.

2. The method of claim 1, comprising
heating the woven fabric during the shrinking step.

3. The method of claim 1, wherein the woven fabric has a length and a width and the length is at least ten times the width.

4. The method of claim 3, wherein the woven fabric comprises a belt configured for use in suspension of a load in an elevator system.

5. The method of claim 4, comprising
coating the belt with a jacket to at least partially cover the tension members.

6. The method of claim 5, comprising
encasing the tension members in the jacket and
establishing a traction surface on at least one side of the jacket, the traction surface being configured to cooperate with a traction sheave of an elevator system.

7. The method of claim 1, wherein the tension members comprise steel cords.

8. The method of claim 1, wherein the tension members each have a diameter and the first dimension is approximately 2 times the diameter and the second, smaller dimension is between the diameter and 1.75 times the diameter.

9. The method of claim 8, wherein the second dimension is between 1.4 times the diameter and 1.6 times the diameter.

10. The method of claim 1, comprising
including fibers generally parallel to the load supporting tension members in the woven fabric.

11. A method of making a woven fabric, comprising the steps of:
weaving a plurality of first load supporting tension members and a first plurality of cross fibers together into a first woven fabric having a spacing between adjacent ones of the first tension members, the spacing having a first dimension;
weaving a plurality of second load supporting tension members and a second plurality of cross fibers together into a second woven fabric including approximately the spacing having the first dimension between adjacent ones of the second tension members; and
positioning the first woven fabric adjacent the second woven fabric with at least one of the second tension members aligned with and between two of the first tension members to thereby decrease the spacing between adjacent ones of the tension members to a second, smaller dimension;
wherein the load supporting tension members are the primary load supporting elements of an elevator load bearing assembly.

12. The method of claim 11, wherein the positioning includes at least one of the first tension members aligned with and between two of the second tension members.

13. The method of claim 11, comprising stretching the cross fibers during the positioning step.

14. The method of claim 11, comprising
securing the first woven fabric and the second woven fabric at least partially together to maintain the at least one of the second tension members aligned with and between the two of the first tension members.

15. The method of claim 14, comprising
applying a jacket to the first and second woven fabrics to establish a belt comprising the first tension members and the second tension members.

16. The method of claim 11, wherein the first and second tension members each have a diameter, the first dimension is approximately 2 times the diameter and the second dimension is less than 1.5 times the diameter.

17. The method of claim 16, wherein the second dimension is approximately 1.1 times the diameter.

18. The method of claim 11, wherein the positioning comprises forcing the first and second woven fabrics together between rollers that are spaced apart a distance approximately equal to a diameter of the tension members.

19. The method of claim 11, comprising
aligning a center of each of the first tension members in a first plane;
aligning a center of each of the second tension members in a second plane; and wherein the positioning comprises forcing the first and second woven fabrics together such that the first plane is essentially coincident with the second plane.

20. The method of claim 19, comprising positioning the center of each of the first tension members and the center of each of the second tension members in a single, common plane; and encasing the first and second tension members in a jacket.

21. The method of claim 11, comprising including fibers generally parallel to the load supporting tension members in at least one of the first woven fabric or the second woven fabric.

\* \* \* \* \*